United States Patent
Boykin et al.

(10) Patent No.: US 8,856,343 B2
(45) Date of Patent: *Oct. 7, 2014

(54) MANAGING COMPUTER RESOURCES IN A DISTRIBUTED COMPUTING SYSTEM

(75) Inventors: James R. Boykin, Pflugerville, TX (US);
Alberto Giammaria, Austin, TX (US);
Patricia D. Griffin, Austin, TX (US);
David B. Lindquist, Raleigh, NC (US);
Robert L. Orr, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 242 days.

This patent is subject to a terminal disclaimer.

(21) Appl. No.: 13/589,527

(22) Filed: Aug. 20, 2012

(65) Prior Publication Data
US 2012/0317292 A1  Dec. 13, 2012

Related U.S. Application Data

(63) Continuation of application No. 11/761,805, filed on Jun. 12, 2007, now Pat. No. 8,266,287.

(51) Int. Cl.
*G06F 15/173* (2006.01)
*G06F 9/50* (2006.01)

(52) U.S. Cl.
CPC ............. *G06F 9/50* (2013.01); *G06F 9/5072* (2013.01)
USPC ........................................................ 709/226

(58) Field of Classification Search
CPC .................................................. H04L 12/585
USPC ........................................................ 709/226
See application file for complete search history.

(56) References Cited

U.S. PATENT DOCUMENTS

| | | | |
|---|---|---|---|
| 6,163,855 A | 12/2000 | Shrivastava et al. | |
| 6,799,208 B1 | 9/2004 | Sankaranarayan et al. | |
| 6,915,338 B1 | 7/2005 | Hunt et al. | |
| 6,947,989 B2 | 9/2005 | Gullotta et al. | |
| 6,985,955 B2 | 1/2006 | Gullotta et al. | |
| 7,080,143 B2 | 7/2006 | Hunt et al. | |
| 7,448,022 B1 | 11/2008 | Ram | |
| 7,814,491 B1 * | 10/2010 | Chen et al. | 718/104 |
| 8,209,417 B2 * | 6/2012 | Kakarla et al. | 709/226 |
| 2003/0233378 A1 | 12/2003 | Butler et al. | |
| 2004/0205076 A1 | 10/2004 | Huang et al. | |
| 2005/0033846 A1 | 2/2005 | Sankaranarayan et al. | |

(Continued)

OTHER PUBLICATIONS

Czajkowski et al. Grid Information Services for Distributed Resource Sharing. 2001 IEEE.*

(Continued)

*Primary Examiner* — Bryan Lee
(74) *Attorney, Agent, or Firm* — Stephen J. Walder, Jr.; Jeffrey S. LaBaw

(57) ABSTRACT

Methods, apparatus, and products for managing computer resources in a distributed computing system are disclosed that include registering, in a configuration management database by a discovery module in response to a modification of a resource in a resource container, the resource in association with a configuration management database identifier, the resource characterized by a resource type and a resource identification, the resource container including a manageability endpoint characterized by a manageability endpoint reference; and managing the resource by a management module in dependence upon a resource management policy and the manageability endpoint reference, the resource management policy including management actions for the resource.

20 Claims, 7 Drawing Sheets

(56) References Cited

U.S. PATENT DOCUMENTS

| | | |
|---|---|---|
| 2005/0038967 A1* | 2/2005 | Umbehocker et al. ........ 711/154 |
| 2005/0131993 A1 | 6/2005 | Fatula et al. |
| 2005/0149940 A1 | 7/2005 | Calinescu et al. |
| 2005/0193115 A1* | 9/2005 | Chellis et al. ................ 709/226 |
| 2005/0198050 A1 | 9/2005 | Bivens, II et al. |
| 2005/0262132 A1 | 11/2005 | Morita et al. |
| 2006/0026552 A1* | 2/2006 | Mazzitelli et al. ............ 717/101 |
| 2006/0212574 A1* | 9/2006 | Maes ............................ 709/226 |
| 2007/0027975 A1 | 2/2007 | Tai et al. |
| 2007/0150628 A1* | 6/2007 | Clark ........................... 710/104 |
| 2007/0271225 A1 | 11/2007 | Labadie et al. |
| 2007/0282986 A1 | 12/2007 | Childress et al. |
| 2007/0288281 A1 | 12/2007 | Gilbert et al. |
| 2007/0288507 A1 | 12/2007 | Strassner et al. |
| 2008/0086513 A1 | 4/2008 | O'Brien et al. |
| 2008/0209047 A1 | 8/2008 | Beigi et al. |
| 2008/0222642 A1 | 9/2008 | Kakarla et al. |
| 2008/0243900 A1* | 10/2008 | Yohanan et al. .............. 707/102 |
| 2008/0313331 A1 | 12/2008 | Boykin et al. |
| 2009/0292521 A1* | 11/2009 | Zhdankin ........................ 703/21 |

OTHER PUBLICATIONS

International Search Report and Written Opinion dated Aug. 14, 2009 for International Application No. PCT/EP2008/056469, 16 pages.
U.S. Appl. No. 11/761,805.
"PCT Search Report", PCT Application No. PCT/EP2008/056469, Oct. 31, 2008, 5 pages.
"Policy Management for Autonomic Computing, Version 1.2", IBM, 2005, 66 pages.
"Web Services Distributed Management: Management Using Web Services (MUWS 1.1) Part 1", OASIS Web Services Distributed Management TC, Aug. 1, 2006, pp. 1-31.
Agrawal, Dakshi et al., "Policy-Based Management of Networked Computing Systems", IEEE Communications Magazine, Oct. 2005, pp. 69-75.
Boros, S. , "Policy-Based Network Management with SNMP", EUNICE2000, XP-002536037, University of Twente, 2000, pp. 1-8.
Chan, Edward, "An Object-Oriented Network Model for the Development of Integrated Network Management Systems", IEEE, Proceedings of the 26th Southeastern Symposium on System Theory, 1994, pp. 359-364.
Czajkowski, Karl et al., "Grid Information Services for Distributed Resource Sharing", Proc. 10th IEEE International Symposium on High-Performance Distributed Computing (HPDC-10), IEEE, 2001, pp. 1-14.
Davy, Steven et al., "Policy-Based Architecture to Enable Autonomic Communications—A Position Paper", IEEE, 2006, pp. 590-594.
Khanli, L. M. et al., "An approach to grid resource selection and fault management based on ECA rules", Future Generation Computer Systems, Elsevier Science Publishers, Amsterdam, NL, vol. 24, No. 4, (2008), available online May 18, 2007, pp. 296-316.
Klie, Torsten et al., "Autonomic Policy-based Management using Web Services", ACM, 2006, 2 pages.
Kreger, Heather et al., "Autonomic Computing and Web Services Distributed Management", IBM, Feb. 6, 2005, 9 pages.
Ozsoyoglu, Gultekin et al., "Querying Web Metadata: Native Score Management and Text Support in Databases", ACM Transactions on Database Systems, vol. 29, No. 4, Dec. 2004, pp. 581-634.
Potts, Mark et al., "Web Services Manageability—Concepts (WS-Manageability)", IBM, Sep. 10, 2003, pp. 1-32.
Simmons, Bradley et al., "Policies, Grids and Autonomic Computer", DEAS 2005, May 21, 2005, pp. 1-5, ACM 1-59593-039-6/05/0005, ACM Digital Library; St. Louis, MO, USA.
Stevens, M. et al., "Policy Framework Monday, Sep. 13, 1999, 4:20 PM; draft-ietf-policy-framework-00.txt", IETF Standard-Working-Draft, Internet Engineering Task Force, IETF, CH, vol. policy, Sep. 1, 1999, XP015025438, ISSN: 0000-0004, 32 pages.
Stevens, Mark L. et al., "Policy-Based Management for IP Networks", Bell Labs Technical Journal, vol. 4, No. 4, ISSN: 1089-7089, Oct. 1, 1999, pp. 75-94.
Tripathi, Anand et al., "Policy-Driven Configuration and Management of Agent Based Distributed Systems", SELMAS '05 at ICSE '05, May 2005, pp. 1-7, ACM 1-59593-116-3/05/05; ACM Digital Library; St. Louis, MO, USA.
Wang, Changzhou et al., "A Policy-Based Approach for QoS Specification and Enforcement in Distributed Service-Oriented Architecture", Proceedings of the 2005 IEEE International Conference on Services Computing (SCC'05), vol. 1, ISBN: 978-0-7695-2408-5, Jul. 11-15, 2005, pp. 307-310.
Wu, Shiow-Yang et al., "Event Engine for Adaptive Mobile Computing", Mobile Data Management, Second International Conference, MDM 2001, Proceedings (Lecture Notes in Computer Science, vol. 1987), Springer-Verlag Berlin, Germany, 2001, pp. 27-38, XP-002499594.
http://springerlink.metapress.com; Springer Link, Netherlands; Active Robust Resource Management in Cluster Computing Using Policies; Online Journal Article; Sep. 2003; pp. 329-350; vol. 11, No. 3, 1064-7570 (Print) 1573-7705 (Online); Springer; Netherlands.

* cited by examiner

MANAGING COMPUTER RESOURCES IN A DISTRIBUTED COMPUTING SYSTEM

BACKGROUND OF THE INVENTION

1. Field of the Invention

The field of the invention is data processing, or, more specifically, methods, apparatus, and products for managing computer resources in a distributed computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in managing computer resources in a distributed computing system. Management products that manage computer resources are typically manually configured each time a resource is modified, that is, each time a resource is added to the managed environment, each time the resource's configuration is changed, or each time a resource is removed from the managed environment. Such manual configuration is time consuming, complex, and error prone. When a resource is introduced or modified in a managed environment a system administrator typically executes the following actions:

- collects information about the modified resource;
- installs agents that manage the specific resource type on the host containing the new resource;
- runs a set of predefined management actions on the resource that include storing configuration information in a configuration management database, running a compliance check on the resource and installing any missing updates, monitoring the health of the resource, and monitoring any deviance of the configuration of the resource from an authorized configuration.

The complexity and time involved in executing these management actions is exacerbated in a distributed computing environment where resources are created, changed, and removed at a faster rate than in other environments.

SUMMARY OF THE INVENTION

Methods, apparatus, and products for managing computer resources in a distributed computing system are disclosed that include registering, in a configuration management database by a discovery module in response to a modification of a resource in a resource container, the resource in association with a configuration management database identifier, the resource characterized by a resource type and a resource identification, the resource container including a manageability endpoint characterized by a manageability endpoint reference; and managing the resource by a management module in dependence upon a resource management policy and the manageability endpoint reference, the resource management policy including management actions for the resource.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
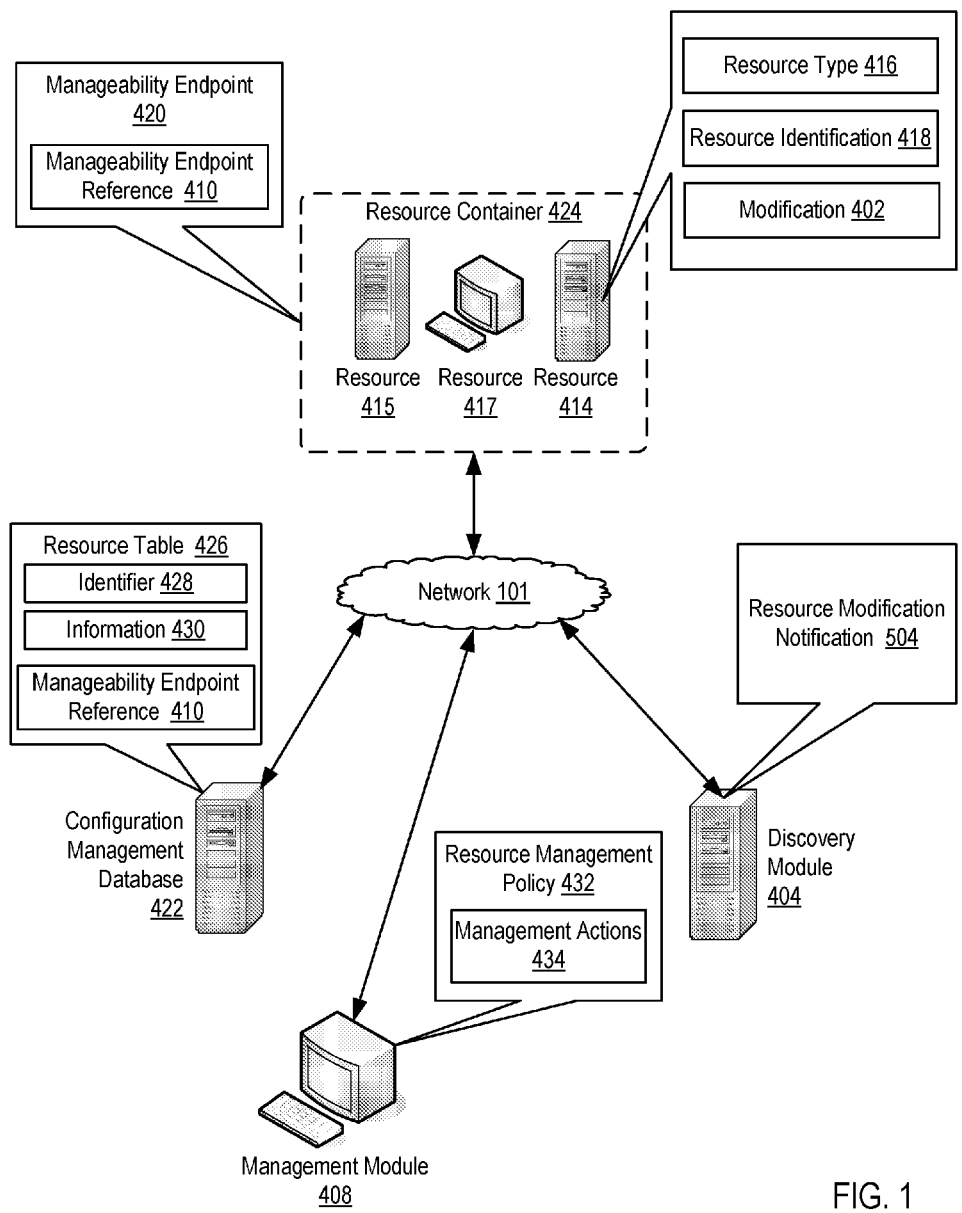
FIG. 1 sets forth a network diagram of a system that manages computer resources in a distributed computing system according to embodiments of the present invention.

Exemplary methods, apparatus, and products for managing computer resources in a distributed computing system in accordance with the present invention are described with reference to the accompanying drawings, beginning with FIG. 1. FIG. 1 sets forth a network diagram of a system that manages computer resources in a distributed computing system according to embodiments of the present invention. A distributed computing system is a computing system that uses two or more network connected computing devices to accomplish common tasks. In the system of FIG. 1 the configuration management database (422), the resources (414, 415, 417), the management module (408), and the discovery module (404), connected for data communications through a data communications network (101), create a distributed computing system.

A distributed computing system may include one or more resource containers. A resource container is a virtual container that includes a group of resources. A resource may be any physical or virtual component of limited availability within a computer system. Each device connected to a computer system is a resource. Each internal computer system component is a resource. Examples of resources include a system's network throughput, hard disk space, random access memory, virtual memory, and CPU time. Virtual system resources include files, network connections, and memory areas. A resource includes a resource type, a category of resources in which the resource belongs, and a resource identification. The resource (414) of FIG. 1 includes a resource type (416) and a resource identification (418).

From time to time, resources in a resource container are modified. Modifications are characterized by different modification types. A modification of a resource may be characterized by such modification types including, for example, an addition of a new resource, a change in an existing resource, or a deletion of a resource from the resource container. The system of FIG. 1 includes a modification (402) of a resource (414) in a resource container (424).

The resource container of FIG. 1 includes a manageability endpoint (420) that is characterized by a manageability endpoint reference (410). A manageability endpoint is a component of a resource container that exposes, to a management module, the configuration state and management operations for a resource in the resource container. The manageability endpoint reference may be implemented in a number of ways in dependence upon the standard used by the management module to manage the resource. If the management module manages the resource in accordance with common information model ('TIM') standard, for example, the manageability endpoint reference is implemented as a CIM object path. If the management module manages the resource in accordance with the java management extensions ('JMX') standard, for example, the manageability endpoint reference is implemented as JMX object reference. If the management module manages the resource in accordance with the Web Services Distributed Management ('WSDM') standard, the manageability endpoint reference is implemented as a WSDM endpoint reference.

The system of FIG. 1 also includes a discovery module (404) that registers, in a configuration management database (422) in response to the modification (402) of the resource (414) in a resource container (424), the resource (414) in association with a configuration management database identifier (428). A configuration management database is a repository of information describing resources of a distributed computing system. The configuration management database identifier is a unique key associated with a resource in the distributed computing system.

In the system of FIG. 1 registering the resource (414) in the configuration management database (422) may be carried out by receiving, by the discovery module (404) from the manageability endpoint (420), a resource modification notification (504). In the system of FIG. 1, the resource modification notification (504) includes the resource identification (418), the resource type (416), and the manageability endpoint reference (410). In the system of FIG. 1, notifications, such as the resource modification notification (504), may be sent and received in accordance with a publish-subscribe notification paradigm. A publish-subscribe notification paradigm is an asynchronous notification paradigm where senders of notifications, called publishers, are not configured to send notifications to specific receivers, called subscribers. Rather, published notifications are characterized into classes, without knowledge of the subscriber. Subscribers express interest in one or more classes, and only receive notifications that are of interest, without knowledge of the publisher. In the system of FIG. 1, the discovery module (404) receives a resource modification notification (504), published by the manageability endpoint (420), by subscribing to a class of notifications that includes resource modification notifications.

In the system of FIG. 1 registering the resource (414) in the configuration management database (422) is also carried out by retrieving, by the discovery module (404) from the manageability endpoint (420) in dependence upon the resource modification notification (504), information (430) describing configuration and manageability properties of the resource. Information describing configuration and manageability properties of the resource may include such information as the size of each partition of a hard drive, the amount of available RAM, the speed of the CPU, and other information as will occur to those of skill in the art. The discovery module may retrieve information describing configuration and manageability properties of the resource by querying the manageability endpoint with, for example, a URL query, such as:

www.RsrcContainer.com/RetrieveInfo.cgi?ResourceID=21,MER=ABCRef

This example URL query includes a manageability endpoint reference, ABCRef, and a resource identification, 21. The common gateway interface, RetrieveInfo.cgi, is a software application hosted at www.RsrcContainer.com that uses the manageability endpoint reference, ABCRef, to retrieve information describing configuration and manageability properties of the resource having the resource identification, 21.

In the system of FIG. 1, registering the resource (414) in the configuration management database (422) is also carried out by populating, by the discovery module (404), the configuration management database (422) with the manageability endpoint reference (410) and the information (430) describing configuration and manageability properties. The discovery module (404) may populate the configuration management database (422) by inserting into a resource table (426) the information (430) describing configuration and manageability properties of the resource (414) in association with the configuration management database identifier (428). For clarity, the resource table (426) of FIG. 1 is depicted as containing only the information (430) describing configuration and manageability properties of the resource (414) in association with the configuration management database identifier. Readers of skill in the art will recognize, however, that a resource table useful for managing computer resources in a distributed computing system in accordance with embodiments of the present invention many also include, the resource identification, the resource type, the IP address of the host containing the resource, and so on.

The system of FIG. 1 also includes a management module that manages the resource (414) in dependence upon a resource management policy (432) and the manageability endpoint reference (410). Examples of management modules include IBM's Tivoli Monitoring ('ITM') product, IBM's Tivoli Provisioning Manager ('TPM') product, and HP's Storage Essentials product. In the system of FIG. 1 the resource management policy (432) includes management actions (434) for the resource. The management module (408) manages the resource (414) in accordance with the management actions (434) specified in the management policy (432). Management actions may include:

running compliance checks and installing missing updates;
monitoring the health of the resource;
monitoring any deviance of the configuration of the resource;
provisioning resources for use by a specific computer task;
other actions as will occur to those of skill in the art.

A resource management policy may be implemented in various ways. A resource management policy may, for example, be implemented in extensible markup language ('XML'). The following is an exemplary resource management policy:

```
<policies>
    <modifcation type="ResourceCreation">
        <resource type="Application">
```

```
            <action type="ManagementActions.Monitoring">
                <property name="EndpointReference">
                    <string>Resource.EndpointRef</string>
                </property>
                <property name="Metrics">
                    <string>MemUsage</string>
                    <string>CPUUsage</string>
                </property>
            </action>
        </resource>
    </modification>
</policies>
```

This XML example is 'pseudocode,' so called because it is an explanation expressed in the form of code as opposed to an actual working model of computer code. This example resource management policy implemented in XML includes a modification type, ResourceCreation, a resource type, Application, and a management action, ManagementActions.Monitoring. The policy specifies several properties to be retrieved from the manageability endpoint when the management module initiates the monitoring management action including the manageability endpoint reference, the memory usage, and the CPU usage.

The arrangement of resources and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
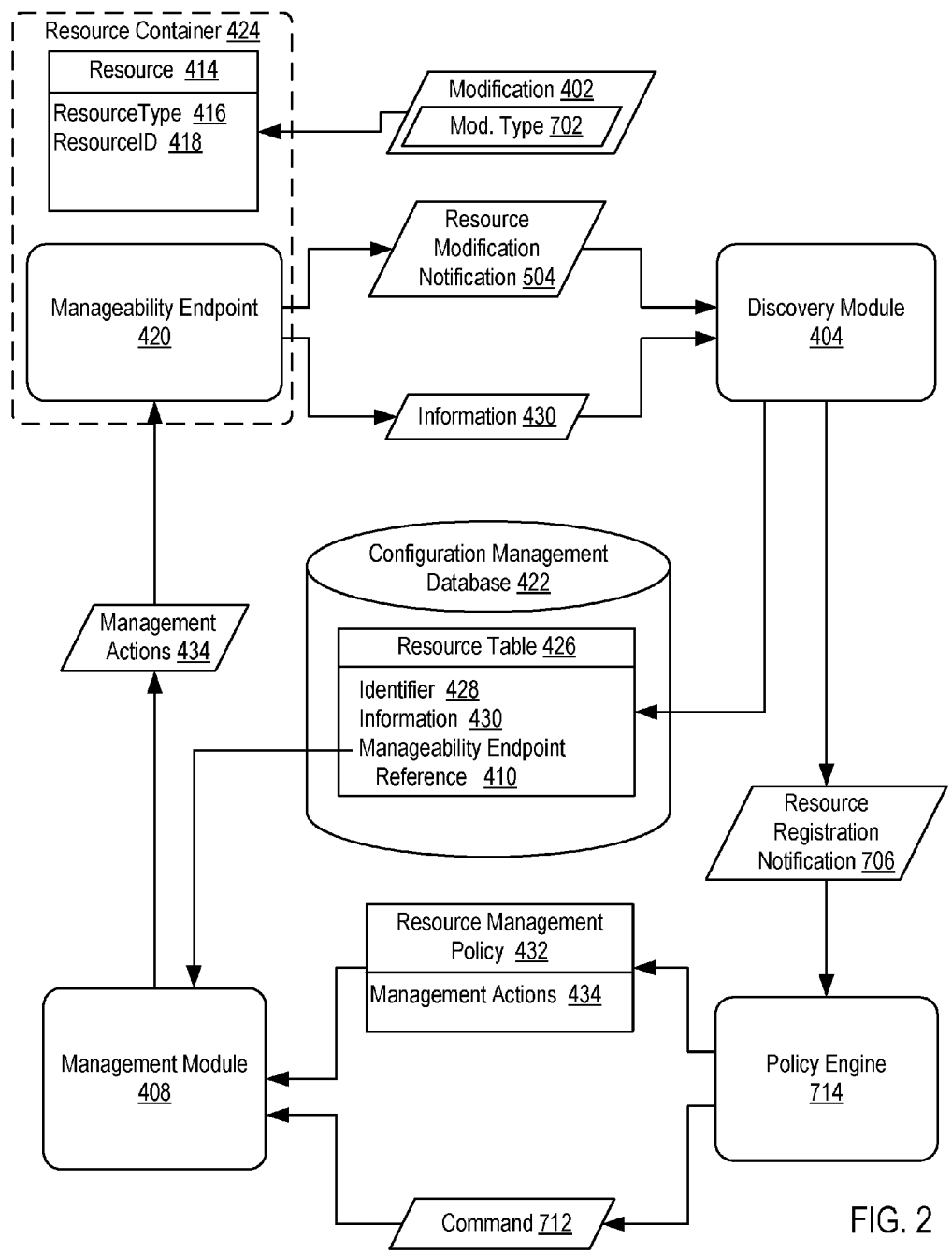
FIG. 2 sets forth a functional block diagram of a system useful for managing computer resources in a distributed computing system according to embodiments of the present invention.

For further explanation, FIG. 2 sets forth a functional block diagram of a system useful for managing computer resources in a distributed computing system according to embodiments of the present invention. The exemplary system of FIG. 2 includes a resource in a resource container (424). The resource container (424) includes a resource (414) characterized by a resource type (416) and a resource identification (416). The resource container (424) also includes a manageability endpoint (420) characterized by a manageability endpoint reference (410).

The system of FIG. 2 includes a discovery module (404), a manageability endpoint (420), a policy engine (714), and a management module (408). The discovery module (404) is implemented as computer program instructions that manage computer resources in a distributed computing system by registering, in a configuration management database (422) in response to a modification (402) of a resource (414) in a resource container (424), the resource (414) in association with a configuration management database identifier (428). In the system of FIG. 2, the modification (402) is characterized by a modification type (702).

In the system of FIG. 2 the discovery module (404) may register the resource (414) in the configuration management database (422) by receiving, from the manageability endpoint (420), a resource modification notification (504), retrieving, from the manageability endpoint (420) in dependence upon the resource modification notification (504), information (430) describing configuration and manageability properties of the resource, and populating the configuration management database (422) with the manageability endpoint reference (410) and the information (430) describing configuration and manageability properties.

In the system of FIG. 2, when the discovery module (404) registers the resource (414) in the configuration management database (422), the discovery module (404) sends, to a policy engine (714), a resource registration notification (706). The resource registration notification (706) typically includes the modification type (702), the configuration management database identifier (428), and the resource type (416). The discovery module may send such a resource registration notification, by publishing the resource registration notification in accordance with a publish-subscribe notification paradigm. The policy engine (714) receives the resource registration notification, by subscribing to a class of notifications that includes resource registration notifications.

The policy engine (174) is implemented as computer program instructions that manage computer resources in a distributed computing system according to embodiments of the present invention by identifying, in dependence upon the modification type (702) and the resource type (416), the resource management policy (432) to be used by the management module in managing the resource. Resource management policies include management actions for resources of a particular resource type that have experienced a modification of a particular modification type. That is, resource management policies are classified by resource type and modification type. One resource management policy may include management actions for a newly created software application while another resource management policy may include different management actions for an increased amount of virtual memory.

In the system of FIG. 2, the management module receives, from the policy engine (714), a command (712) to begin managing the resource. A command to begin managing a resource typically includes the configuration management database identifier (428) associated with the resource. The management module retrieves (716), from the configuration management database (422) in dependence upon the configuration management database identifier (428), the manageability endpoint reference (410).

In the system of FIG. 2 the management module (408) manages the resource (414) in dependence upon the resource management policy (432) and the manageability endpoint reference (410). The resource management policy (432) of FIG. 2 includes management actions (434) for the resource. The management module (408) manages the resource (414) by carrying out the management actions specified in the resource management policy (432).

Managing computer resources in a distributed computing system in accordance with the present invention is generally implemented with computers, that is, with automated computing machinery. In the system of FIG. 1, for example, the resources, discovery module, management module, policy engine, and configuration management database are implemented to some extent at least as computers. For further explanation, therefore, FIG. 3 sets forth a block diagram of automated computing machinery comprising an exemplary computer (152) useful in managing computer resources in a distributed computing system according to embodiments of the present invention. The computer (152) of FIG. 3 includes at least one computer processor (156) or 'CPU' as well as random access memory (168) ('RAM') which is connected through a system bus (160) to processor (156) and to other components of the computer.

Stored in RAM (168) is an discovery module (404), a module of computer program instructions for managing computer resources in a distributed computing system according to embodiments of the present invention that register, in a configuration management database (422) in response to a modification of a resource in a resource container, the resource in association with a configuration management database identifier. The resource container includes a manageability endpoint characterized by a manageability endpoint reference (410). The discovery module (404) may register the resource in the configuration management database (422) by receiving, from the manageability endpoint, a resource modification notification (504), retrieving, from the manageability endpoint in dependence upon the resource modification notification (504), information (430) describing configuration and manageability properties of the resource, and populating the configuration management database (422) with the manageability endpoint reference (410) and the information (430) describing configuration and manageability properties.

Also stored in RAM (168) is an operating system (154). Operating systems useful in computers according to embodiments of the present invention include UNIX™, Linux™, Microsoft Vista™, Microsoft XP™, AIX™, IBM's i5/OS™, and others as will occur to those of skill in the art. Operating system (154), discovery module (404), resource modification notification (504), and information (430) in the example of FIG. 3 are shown in RAM (168), but many components of such software typically are stored in non-volatile memory also, for example, on a disk drive (170).

Figure 3:
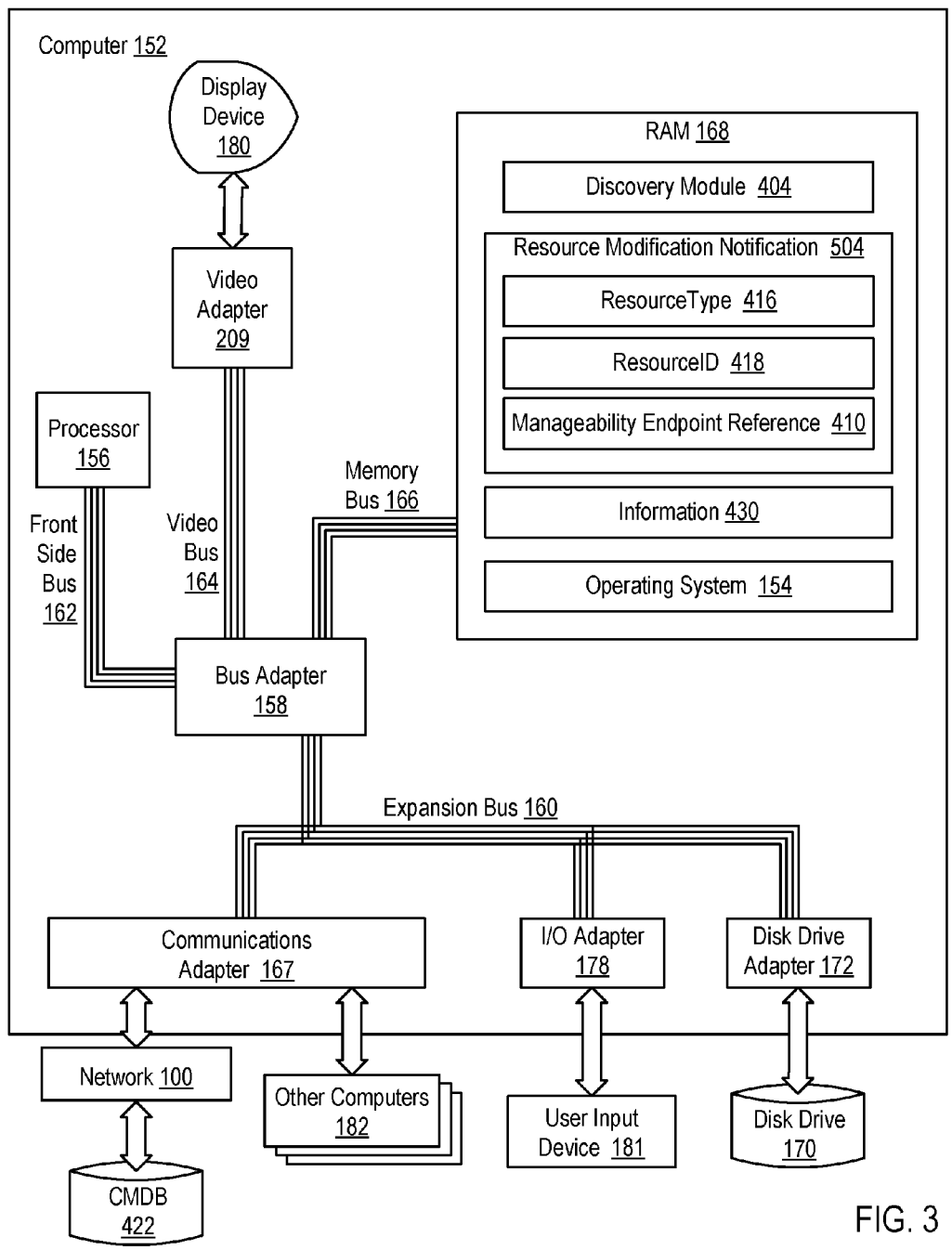
FIG. 3 sets forth a block diagram of automated computing machinery comprising an exemplary computer useful in managing computer resources in a distributed computing system according to embodiments of the present invention.

The computer (152) of FIG. 3 includes a bus adapter (158), a computer hardware component that contains drive electronics for the high speed buses, the front side bus (162), the video bus (164), and the memory bus (166), as well as drive electronics for the slower expansion bus (160). Examples of bus adapters useful for managing computer resources in a distributed computing system according to embodiments of the present invention include the Intel Northbridge, the Intel Memory Controller Hub, the Intel Southbridge, and the Intel I/O Controller Hub. Examples of expansion buses useful for managing computer resources in a distributed computing system according to embodiments of the present invention include Industry Standard Architecture ('ISA') buses and Peripheral Component Interconnect ('PCI') buses.

The computer (152) of FIG. 3 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory (so-called 'EEPROM' or 'Flash' memory), RAM drives, and so on, as will occur to those of skill in the art.

The example computer (152) of FIG. 3 includes one or more input/output ('I/O') adapters (178). I/O adapters in computers implement user-oriented input/output through, for example, software drivers and computer hardware for controlling output to display devices such as computer display screens, as well as user input from user input devices (181) such as keyboards and mice. The example computer (152) of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 3 includes a communications adapter (167) for data communications with other computers (182) and for data communications with a data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for managing computer resources in a distributed computing system according to embodiments of the present invention include modems for wired dial-up communications, Ethernet (IEEE 802.3) adapters for wired data communications network communications, and 802.11 adapters for wireless data communications network communications.

Figure 4:
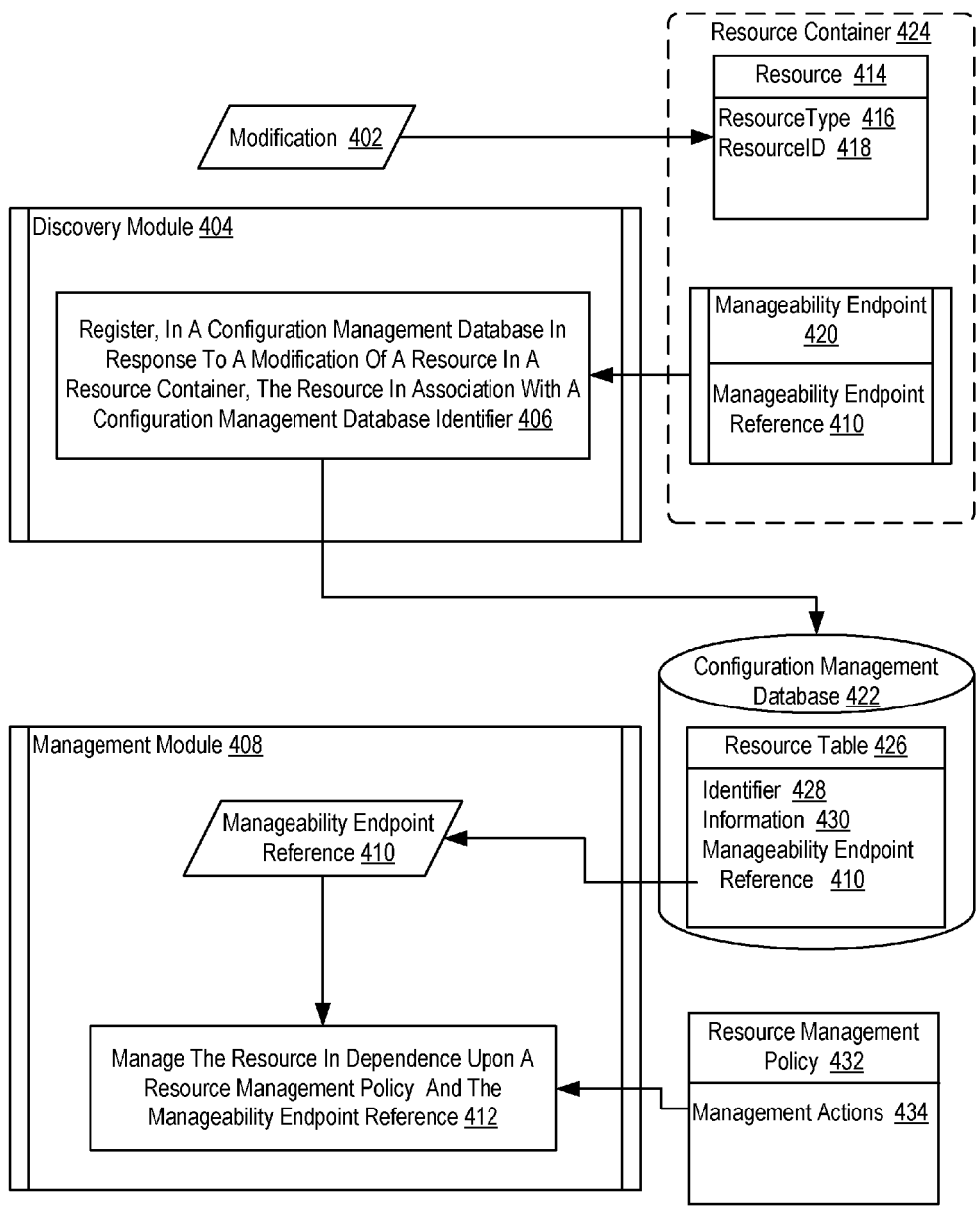
FIG. 4 sets forth a flow chart illustrating an exemplary method for managing computer resources in a distributed computing system according to embodiments of the present invention.

For further explanation, FIG. 4 sets forth a flow chart illustrating an exemplary method for managing computer resources in a distributed computing system according to embodiments of the present invention. The method of FIG. 4 includes registering (406), in a configuration management database (422) by a discovery module (404) in response to a modification (402) of a resource (414) in a resource container (424), the resource (414) in association with a configuration management database identifier (428). In the method of FIG. 4, the resource (414) is characterized by a resource type (416) and a resource identification (418). Also in the method of FIG. 4, the resource container (424) includes a manageability endpoint (420) characterized by a manageability endpoint reference (410). The discovery module may register (406) the resource (414) in the configuration management database (422) by receiving, from the manageability endpoint (420), a resource modification notification, retrieving, from the manageability endpoint (420) in dependence upon the resource modification notification, information (430) describing configuration and manageability properties of the resource, and populating the configuration management database (422) with the manageability endpoint reference (410) and the information (430) describing configuration and manageability properties.

The method of FIG. 4 also includes managing (412) the resource (414) by a management module (408) in dependence upon a resource management policy (432) and the manageability endpoint reference (410). In the method of FIG. 4, the resource management policy (432) includes management actions (434) for the resource. The management module (408) manages (412) the resource (414) by carrying out the management actions specified in the resource management policy (432).

Figure 5:
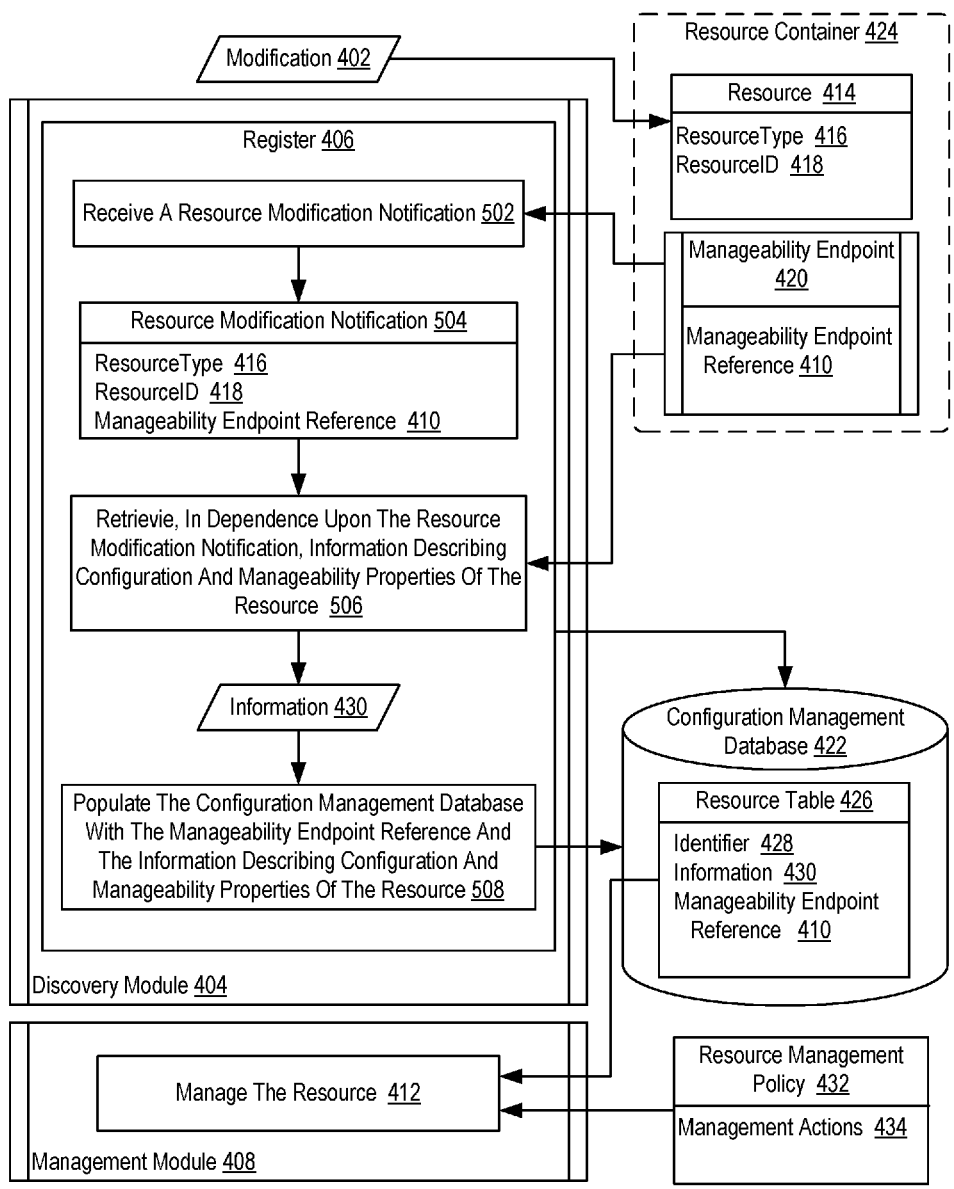
FIG. 5 sets forth a flow chart illustrating a further exemplary method for managing computer resources in a distributed computing system according to embodiments of the present invention.

For further explanation, FIG. 5 sets forth a flow chart illustrating a further exemplary method for managing computer resources in a distributed computing system according to embodiments of the present invention. The method of FIG. 5 is similar to the method of FIG. 4, including, as it does, the discovery module's (404) registering (406) the resource (414) in association with a configuration management database identifier (428) and the management module's (408) managing (412) the resource (414), all of which operate in a similar manner as described above.

In the method of FIG. 5 however, registering (406) the resource (414) in association with a configuration management database identifier (428) is carried out by receiving (502), by the discovery module (404) from the manageability endpoint (420), a resource modification notification (504). In the method of FIG. 5, the resource modification notification (504) includes the resource identification (418), the resource type (416), and the manageability endpoint reference (410). In the method of FIG. 5, notifications, such as the resource modification notification (504), may be sent and received in accordance with a publish-subscribe notification paradigm. A publish-subscribe notification paradigm is an asynchronous notification paradigm where senders of notifications, called publishers, are not configured to send notifications to specific receivers, called subscribers. Rather, published notifications are characterized into classes, without knowledge of the subscriber. Subscribers express interest in one or more classes, and only receive notifications that are of interest, without knowledge of the publisher. In the system of FIG. 5, the discovery module (404) receives a resource modification notification (504), published by the manageability endpoint (420), by subscribing to a class of notifications that includes resource modification notifications.

The method of FIG. 5 also includes retrieving (506), by the discovery module (404) from the manageability endpoint (420) in dependence upon the resource modification notification (504), information (430) describing configuration and manageability properties of the resource. The discovery module (404) may retrieve information (430) describing configuration and manageability properties of the resource by querying the manageability endpoint (420) for the information. Such a query may include the resource identification (418) and the manageability endpoint reference (410).

The method of FIG. 5 also includes populating (508), by the discovery module (404), the configuration management database (422) with the manageability endpoint reference (410) and the information (430) describing configuration and manageability properties. The discovery module (404) may populate the configuration management database (422) by inserting into a resource table (426) the information (430) describing configuration and manageability properties of the resource (414) in association with the configuration management database identifier (428).

Figure 6:
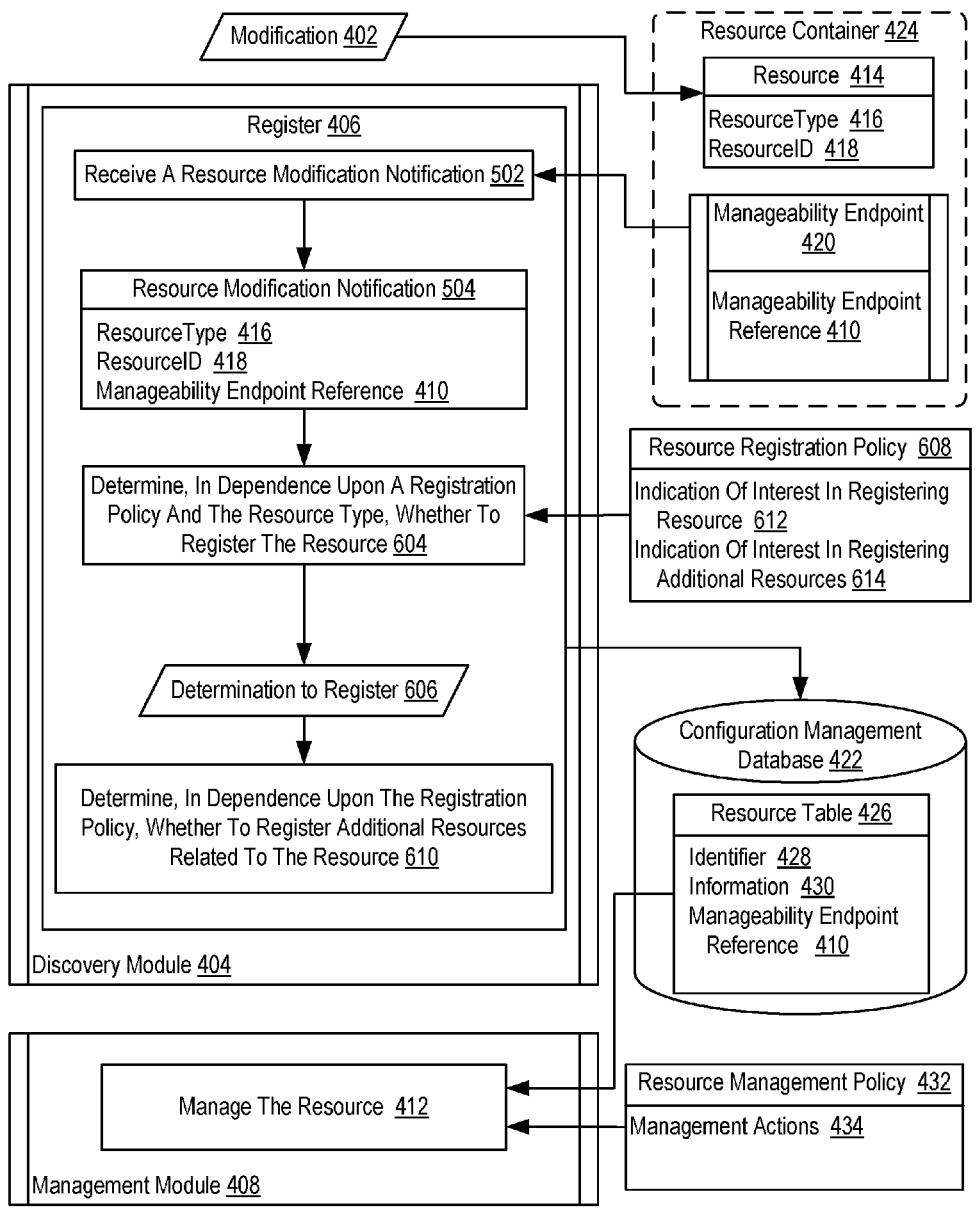
FIG. 6 sets forth a flow chart illustrating a further exemplary method for managing computer resources in a distributed computing system according to embodiments of the present invention.

For further explanation, FIG. 6 sets forth a flow chart illustrating a further exemplary method for managing computer resources in a distributed computing system according to embodiments of the present invention. The method of FIG. 6 is similar to the method of FIG. 4, including, as it does, the discovery module's (404) registering (406) the resource (414) in association with a configuration management database identifier (428) and the management module's (408) managing (412) the resource (414), all of which operate in a similar manner as described above.

In the method of FIG. 6, however, registering (406) the resource (414) in association with a configuration management database identifier (428) is carried out by receiving (502), by the discovery module (404) from the manageability endpoint (420), a resource modification notification (504). In the method of FIG. 6, the resource modification notification (504) includes the resource identification (418), the resource type (416), and the manageability endpoint reference (410).

In the method of FIG. 6, registering (406) the resource (414) in the configuration management database (422) also includes determining (604), by the discovery module (404) in dependence upon a resource registration policy (608) and the resource type (416), whether to register the resource (414). In the method of FIG. 6, the resource registration policy (608) includes an indication of interest (612) in the resource and an indication of interest (614) in registering additional resources related to the resource. Resources may be related to one another within a system in various ways. A computer system, for example, may include many additional resources, such as, RAM, an operating system, a hard drive, and so on. A resource registration policy that includes an indication of interest in registering a resource and an indication of interest in registering additional resources related to the resource may be implemented as any data structure, including for example a table, such as the following table:

TABLE 1

| Resource Registration Policy | | |
|---|---|---|
| Type Of Resource | Interest In Registering Resource | Interest In Registering Additional Resources |
| RAM | Yes | No |
| Application | Yes | Yes |
| Computer System | Yes | Yes |

The example resource registration policy of Table 1 includes a column for the resource type. The resource types depicted in Table 1 include RAM, a software application, and a complete computer system. For a resource having the resource type, RAM, this example resource registration policy indicates that there is an interest in registering the resource, but no interest in registering additional resources related to the resource having the resource type, RAM. For a resource having the resource type, Application, this example resource registration policy indicates that there is an interest in registering the resource, and there is also an interest in registering additional resources related to the resource having the resource type, Application. For a resource having the resource type, Computer System, this example resource registration policy indicates that there is an interest in registering the resource, and there is also an interest in registering additional resources related to the resource having the resource type, Computer System. In the method of FIG. 6, the discovery module (404) may determine (604) whether to register the resource (414) by finding, in the resource registration policy (608), an interest in registering a resource characterized by the resource type (416).

When the discovery module makes a determination (606) to register the resource the discovery module may also determine (610), in dependence upon the resource registration policy (608), whether to register additional resources related to the resource. That is, the discovery module determines whether to retrieve from the manageability endpoint (420) information describing additional resources related to the resource. The discovery module (404) may determine whether to register additional resources related to the resource by finding, in the resource registration policy (608), an interest in registering additional resources.

Figure 7:
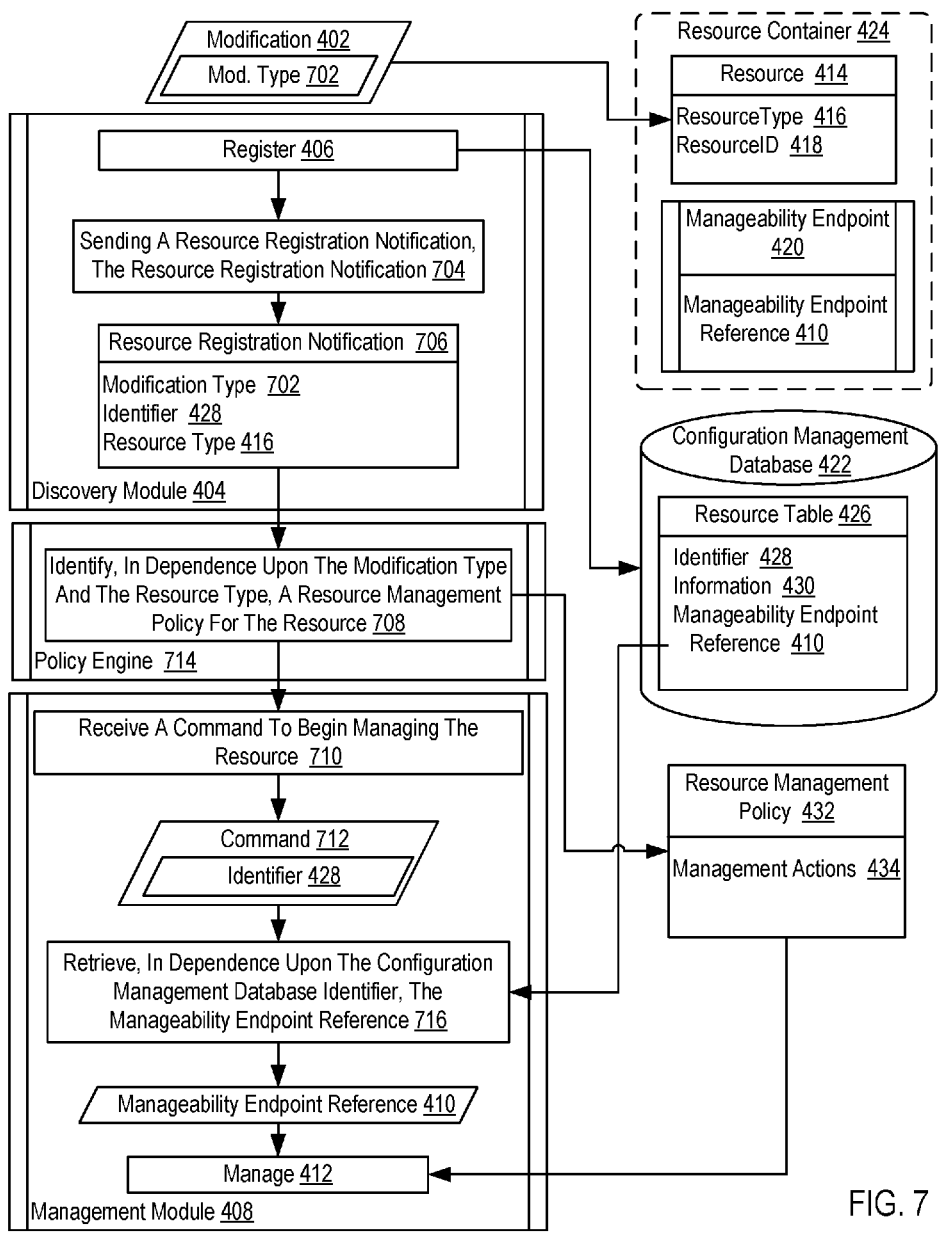
FIG. 7 sets forth a flow chart illustrating a further exemplary method for managing computer resources in a distributed computing system according to embodiments of the present invention.

For further explanation, FIG. 7 sets forth a flow chart illustrating a further exemplary method for managing computer resources in a distributed computing system according to embodiments of the present invention. The method of FIG. 7 is similar to the method of FIG. 4, including, as it does, the discovery module's (404) registering (406) the resource (414) in association with a configuration management database identifier (428) and the management module's (408) managing (412) the resource (414), all of which operate in a similar manner as described above.

In the method of FIG. 7, however, the modification (402) of the resource is characterized by a modification type (702) and the discovery module (404) sends (704), to a policy engine (714), a resource registration notification (706). In the method FIG. 7, the resource registration notification (706) includes the modification type (702), the configuration management database identifier (428), and the resource type (416). The discovery module may send such a resource registration notification by publishing the resource registration notification in accordance with a publish-subscribe notification paradigm. The policy engine (714) receives the resource registration notification, by subscribing to a class of notifications that includes resource registration notifications.

The method of FIG. 7 also includes, identifying (708), by the policy engine (714) in dependence upon the modification type (702) and the resource type (416), the resource management policy (432). Resource management policies include management actions for resources of a particular resource type that have experienced a modification of a particular modification type. That is, resource management policies are classified by resource type and modification type. One resource management policy may include management actions for a newly created application while another resource management policy may include different management actions for an increased amount of virtual memory.

The method of FIG. 7 also includes receiving (710), by the management module (408) from the policy engine (714), a command (712) to begin managing the resource. In the method of FIG. 7, the command (712) includes the configuration management database identifier (428). The management module (408) retrieves (716), from the configuration management database (422) in dependence upon the configuration management database identifier (428), the manageability endpoint reference (410). The manageability endpoint reference (410) is used by the management module to carry out management actions specified in the resource management policy.

In view of the explanations set forth above, readers will recognize that the benefits of managing computer resources in a distributed computing system according to embodiments of the present invention include:

- allowing management products to automatically manage resources upon a modification of a resource, eliminating the complex, manual, and error prone steps of configuring management infrastructure to recognize modified resources and manage modified resources;
- increasing efficiency in updating the configuration management database by reducing the latency between the time a modification of a resource occurs and the time the modification is reflected in the configuration management database; and
- others as will occur to those of skill in the art.

Exemplary embodiments of the present invention are described largely in the context of a fully functional computer system for managing computer resources in a distributed computing system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing computer resources in a distributed computing system, the method comprising:
   registering, in a configuration management database by a discovery module in response to a modification of a resource in a resource container, the resource in association with a configuration management database identifier, the resource characterized by a resource type and a resource identification, the resource container comprising a manageability endpoint characterized by a manageability endpoint reference;
   generating, by the discovery module, a resource registration notification, the resource registration notification comprising a configuration management database identifier;
   receiving, by a management module, a command to begin managing the resource, the command being generated based on the resource registration notification and comprising the configuration management database identifier;
   retrieving, by the management module from the configuration management database, in dependence upon the configuration management database identifier, the manageability endpoint reference; and
   managing, by the management module, the resource in dependence upon the manageability endpoint reference and a resource management policy corresponding to the configuration management database identifier, the resource management policy comprising management actions for the resource.

2. The method of claim 1 wherein registering the resource in a configuration management database further comprises:
   receiving, by the discovery module from the manageability endpoint, a resource modification notification, the resource modification notification comprising the resource identification, the resource type, and the manageability endpoint reference;
   retrieving, by the discovery module from the manageability endpoint in dependence upon the resource modification notification, information describing configuration and manageability properties of the resource; and
   populating, by the discovery module, the configuration management database with the manageability endpoint reference and the information describing configuration and manageability properties.

3. The method of claim 1 wherein registering the resource in a configuration management database further comprises:
receiving, by the discovery module from the manageability endpoint, a resource modification notification, the resource modification notification comprising the resource identification, the resource type, and the manageability endpoint reference; and
determining, by the discovery module in dependence upon a resource registration policy and the resource type, whether to register the resource, the resource registration policy comprising an indication of interest in the resource.

4. The method of claim 1 wherein:
the modification of the resource is characterized by a modification type,
the resource registration notification is sent, by the discovery module, to a policy engine, the resource registration notification comprising the modification type, the configuration management database identifier, and the resource type, and
the policy engine identifies, in dependence upon the modification type and the resource type, the resource management policy and sends the command to the management module.

5. The method of claim 1, wherein the configuration management database identifier associated with the resource is a unique key associated with the resource, and wherein each resource, in a plurality of resources registered in the configuration management database, has its own unique configuration management database identifier.

6. The method of claim 1, wherein the manageability endpoint is a component of the resource container that exposes, to the management module, a configuration state and management operations for the resource in the resource container, and wherein the manageability endpoint is identified by the manageability endpoint reference.

7. The method of claim 6, wherein the management module manages the resource in accordance with a common information model (CIM) standard, and wherein the manageability endpoint reference is implemented as a CIM object path.

8. The method of claim 6, wherein the management module manages the resource in accordance with a Java Management Extensions (JMX) standard, and wherein the manageability endpoint reference is implemented as a JMX object reference.

9. The method of claim 6, wherein the management module manages the resource in accordance with a Web Services Distributed Management (WSDM) standard, and wherein the manageability endpoint reference is implemented as a WSDM endpoint reference.

10. A method of managing computer resources in a distributed computing system, the method comprising:
registering, in a configuration management database by a discovery module in response to a modification of a resource in a resource container, the resource in association with a configuration management database identifier, the resource characterized by a resource type and a resource identification, the resource container comprising a manageability endpoint characterized by a manageability endpoint reference; and
managing the resource by a management module in dependence upon a resource management policy and the manageability endpoint reference, the resource management policy comprising management actions for the resource, wherein registering the resource in a configuration management database further comprises:
receiving, by the discovery module from the manageability endpoint, a resource modification notification, the resource modification notification comprising the resource identification, the resource type, and the manageability endpoint reference; and
determining, by the discovery module in dependence upon a resource registration policy and the resource type, whether to register the resource, the resource registration policy comprising an indication of interest in the resource, and wherein the resource registration policy further comprises an indication of interest in registering additional resources related to a resource, and the method further comprises determining, by the discovery module in dependence upon the resource registration policy, whether to register additional resources related to the resource.

11. An apparatus for managing computer resources in a distributed computing system, the apparatus comprising a computer processor, a computer memory operatively coupled to the computer processor, the computer memory having disposed within it computer program instructions capable of:
registering, in a configuration management database by a discovery module in response to a modification of a resource in a resource container, the resource in association with a configuration management database identifier, the resource characterized by a resource type and a resource identification, the resource container comprising a manageability endpoint characterized by a manageability endpoint reference;
generating, by the discovery module, a resource registration notification, the resource registration notification comprising a configuration management database identifier;
receiving, by a management module, a command to begin managing the resource, the command being generated based on the resource registration notification and comprising the configuration management database identifier;
retrieving, by the management module from the configuration management database, in dependence upon the configuration management database identifier, the manageability endpoint reference; and
managing, by the management module, the resource in dependence upon the manageability endpoint reference and a resource management policy corresponding to the configuration management database identifier, the resource management policy comprising management actions for the resource.

12. The apparatus of claim 11 wherein registering the resource in a configuration management database further comprises:
receiving, by the discovery module from the manageability endpoint, a resource modification notification, the resource modification notification comprising the resource identification, the resource type, and the manageability endpoint reference;
retrieving, by the discovery module from the manageability endpoint in dependence upon the resource modification notification, information describing configuration and manageability properties of the resource; and
populating, by the discovery module, the configuration management database with the manageability endpoint reference and the information describing configuration and manageability properties.

13. The apparatus of claim 11 wherein registering the resource in a configuration management database further comprises:
receiving, by the discovery module from the manageability endpoint, a resource modification notification, the resource modification notification comprising the resource identification, the resource type, and the manageability endpoint reference; and determining, by the discovery module in dependence upon a resource registration policy and the resource type, whether to register the resource, the resource registration policy comprising an indication of interest in the resource.

14. The apparatus of claim 11 wherein:

the modification of the resource is characterized by a modification type, the resource registration notification is sent, by the discovery module, to a policy engine, the resource registration notification comprising the modification type, the configuration management database identifier, and the resource type, and the policy engine identifies, in dependence upon the modification type and the resource type, the resource management policy and sends the command to the management module.

15. An apparatus for managing computer resources in a distributed computing system, the apparatus comprising a computer processor, a computer memory operatively coupled to the computer processor, the computer memory having disposed within it computer program instructions capable of:

registering, in a configuration management database by a discovery module in response to a modification of a resource in a resource container, the resource in association with a configuration management database identifier, the resource characterized by a resource type and a resource identification, the resource container comprising a manageability endpoint characterized by a manageability endpoint reference; and managing the resource by a management module in dependence upon a resource management policy and the manageability endpoint reference, the resource management policy comprising management actions for the resource, wherein registering the resource in a configuration management database further comprises:

receiving, by the discovery module from the manageability endpoint, a resource modification notification, the resource modification notification comprising the resource identification, the resource type, and the manageability endpoint reference; and determining, by the discovery module in dependence upon a resource registration policy and the resource type, whether to register the resource, the resource registration policy comprising an indication of interest in the resource, and wherein the resource registration policy further comprises an indication of interest in registering additional resources related to a resource, and the apparatus further comprises computer program instructions capable of determining, by the discovery module in dependence upon the resource registration policy, whether to register additional resources related to the resource.

16. A computer program product for managing computer resources in a distributed computing system, the computer program product disposed in a storage device, the computer program product comprising computer program instructions capable of:

registering, in a configuration management database by a discovery module in response to a modification of a resource in a resource container, the resource in association with a configuration management database identifier, the resource characterized by a resource type and a resource identification, the resource container comprising a manageability endpoint characterized by a manageability endpoint reference;

generating, by the discovery module, a resource registration notification, the resource registration notification comprising a configuration management database identifier;

receiving, by a management module, a command to begin managing the resource, the command being generated based on the resource registration notification and comprising the configuration management database identifier;

retrieving, by the management module from the configuration management database, in dependence upon the configuration management database identifier, the manageability endpoint reference; and managing, by the management module, the resource in dependence upon the manageability endpoint reference and a resource management policy corresponding to the configuration management database identifier, the resource management policy comprising management actions for the resource.

17. The computer program product of claim 16 wherein registering the resource in a configuration management database further comprises:

receiving, by the discovery module from the manageability endpoint, a resource modification notification, the resource modification notification comprising the resource identification, the resource type, and the manageability endpoint reference;

retrieving, by the discovery module from the manageability endpoint in dependence upon the resource modification notification, information describing configuration and manageability properties of the resource; and populating, by the discovery module, the configuration management database with the manageability endpoint reference and the information describing configuration and manageability properties.

18. The computer program product of claim 16 wherein registering the resource in a configuration management database further comprises:

receiving, by the discovery module from the manageability endpoint, a resource modification notification, the resource modification notification comprising the resource identification, the resource type, and the manageability endpoint reference; and determining, by the discovery module in dependence upon a resource registration policy and the resource type, whether to register the resource, the resource registration policy comprising an indication of interest in the resource.

19. The computer program product of claim 16 wherein:

the modification of the resource is characterized by a modification type, the resource registration notification is sent, by the discovery module, to a policy engine, the resource registration notification comprising the modification type, the configuration management database identifier, and the resource type, and the policy engine identifies, in dependence upon the modification type and the resource type, the resource management policy and sends the command to the management module.

20. A computer program product for managing computer resources in a distributed computing system, the computer program product disposed in a storage device, the computer program product comprising computer program instructions capable of:

registering, in a configuration management database by a discovery module in response to a modification of a resource in a resource container, the resource in association with a configuration management database identifier, the resource characterized by a resource type and a resource identification, the resource container comprising a manageability endpoint characterized by a manageability endpoint reference; and managing the resource by a management module in dependence upon a resource management policy and the manageability endpoint reference, the resource management policy comprising management actions for the resource, wherein registering the resource in a configuration management database further comprises:

receiving, by the discovery module from the manageability endpoint, a resource modification notification, the resource modification notification comprising the resource identification, the resource type, and the manageability endpoint reference; and determining, by the discovery module in dependence upon a resource registration policy and the resource type, whether to register the resource, the resource registration policy comprising an indication of interest in the resource, and wherein the resource registration policy further comprises an indication of interest in registering additional resources related to a resource, and the computer program product further comprises computer program instructions capable of determining, by the discovery module in dependence upon the resource registration policy, whether to register additional resources related to the resource.

\* \* \* \* \*